(12) United States Patent
Park

(10) Patent No.: US 8,108,959 B2
(45) Date of Patent: Feb. 7, 2012

(54) WASHING A TUB OR A DRUM IN A WASHING MACHINE

(75) Inventor: Seok Kyu Park, Changwon-si (KR)

(73) Assignee: LG Electronics Inc., Seoul (KR)

( * ) Notice: Subject to any disclaimer, the term of this patent is extended or adjusted under 35 U.S.C. 154(b) by 884 days.

(21) Appl. No.: 11/629,391

(22) PCT Filed: Dec. 22, 2005

(86) PCT No.: PCT/KR2005/004483
§ 371 (c)(1),
(2), (4) Date: Jan. 18, 2008

(87) PCT Pub. No.: WO2006/090973
PCT Pub. Date: Aug. 31, 2006

(65) Prior Publication Data
US 2008/0245392 A1 Oct. 9, 2008

(30) Foreign Application Priority Data

| Feb. 25, 2005 | (KR) | 10-2005-0016063 |
| Feb. 25, 2005 | (KR) | 10-2005-0016068 |
| Feb. 25, 2005 | (KR) | 10-2005-0016070 |
| Apr. 27, 2005 | (KR) | 10-2005-0035045 |

(51) Int. Cl.
*D06F 39/04* (2006.01)

(52) U.S. Cl. ............................. 8/149.3; 8/158

(58) Field of Classification Search ................. 8/149.3, 8/158, 159
See application file for complete search history.

(56) References Cited

U.S. PATENT DOCUMENTS

| 4,777,682 A * | 10/1988 | Dreher et al. ..................... 8/158 |
| 7,585,374 B2 * | 9/2009 | Sechelmann ..................... 134/18 |
| 2004/0187529 A1 * | 9/2004 | Kim et al. ........................ 68/207 |
| 2004/0237603 A1 * | 12/2004 | Kim et al. ......................... 68/15 |
| 2006/0151005 A1 * | 7/2006 | Kim et al. ...................... 134/22.1 |
| 2008/0092602 A1 * | 4/2008 | Quddus et al. .................. 68/5 C |

FOREIGN PATENT DOCUMENTS

| CN | 1490456 | 4/2004 |
| CN | 1537995 | 10/2004 |
| DE | 1 585 998 A | 11/1969 |
| DE | 19751814 A1 * | 6/1998 |
| DE | 197 51 028 A1 | 5/1999 |
| EP | 0 808 936 A2 | 11/1997 |
| JP | 05-023493 | 2/1993 |
| JP | 2004081651 A * | 3/2004 |

OTHER PUBLICATIONS

Electronic translation of DE 19751814, Jun. 10, 1998.*

* cited by examiner

*Primary Examiner* — Joseph L Perrin
(74) *Attorney, Agent, or Firm* — McKenna Long & Aldridge LLP

(57) ABSTRACT

The present invention relates to a method for washing a washing tub (120) in a washing machine, and a washing machine having a washing tub washing course provided thereto for enabling washing tub (120) washing by the same, and more particularly, to a method for which makes effective washing tub washing, with a small amount of washing water consumption, a lower power consumption, and high washing effect; and a washing machine having the same applied thereto. A method for washing a tub (120) or a drum (130) in a washing machine having the tub (120), the drum (130) rotatably mounted in the tub (120), and a steam supply unit for supplying steam to the tub (120), includes a steam supply step for supplying steam to the tub by using the steam supply unit.

18 Claims, 15 Drawing Sheets

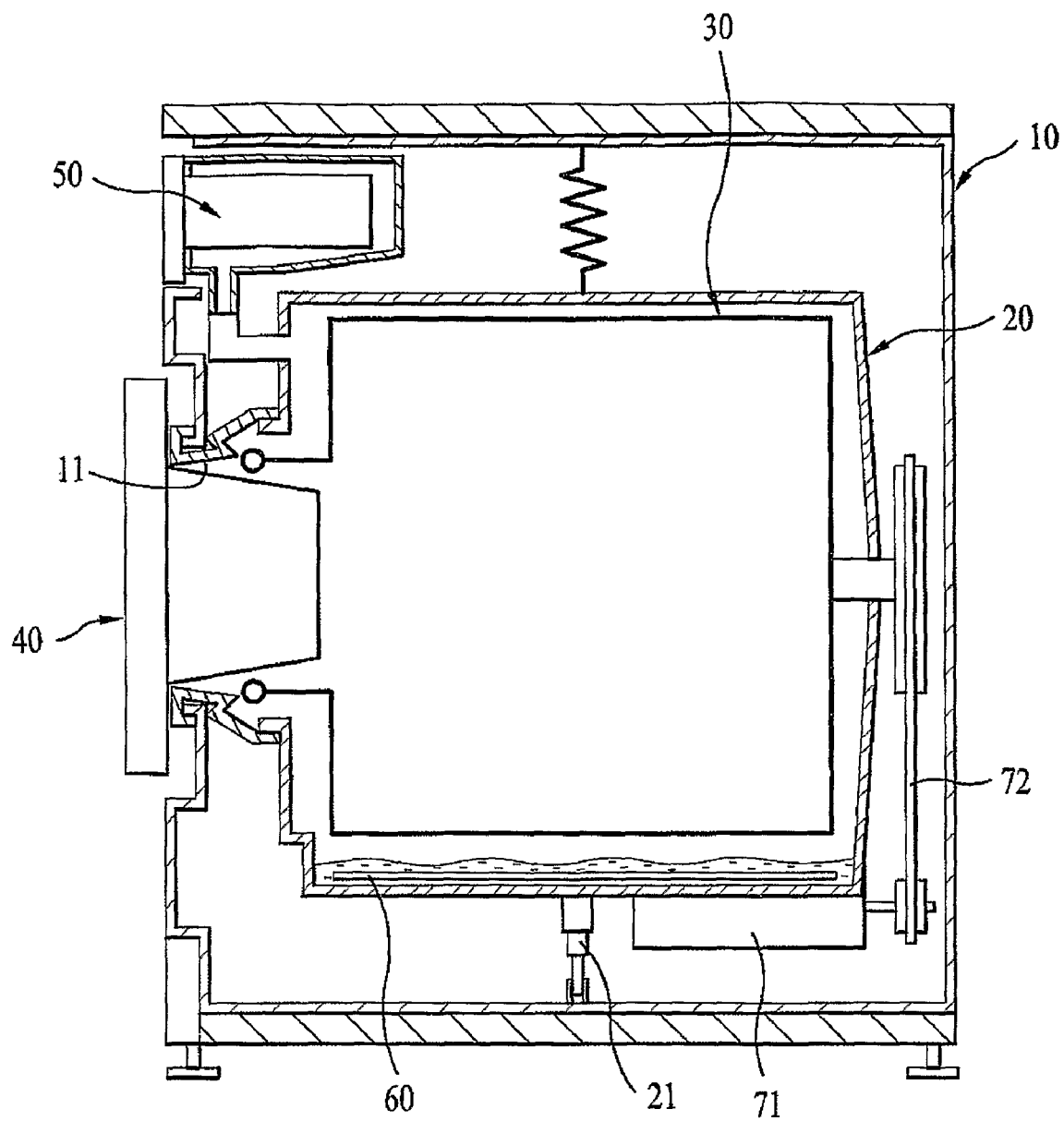
[Fig. 1]

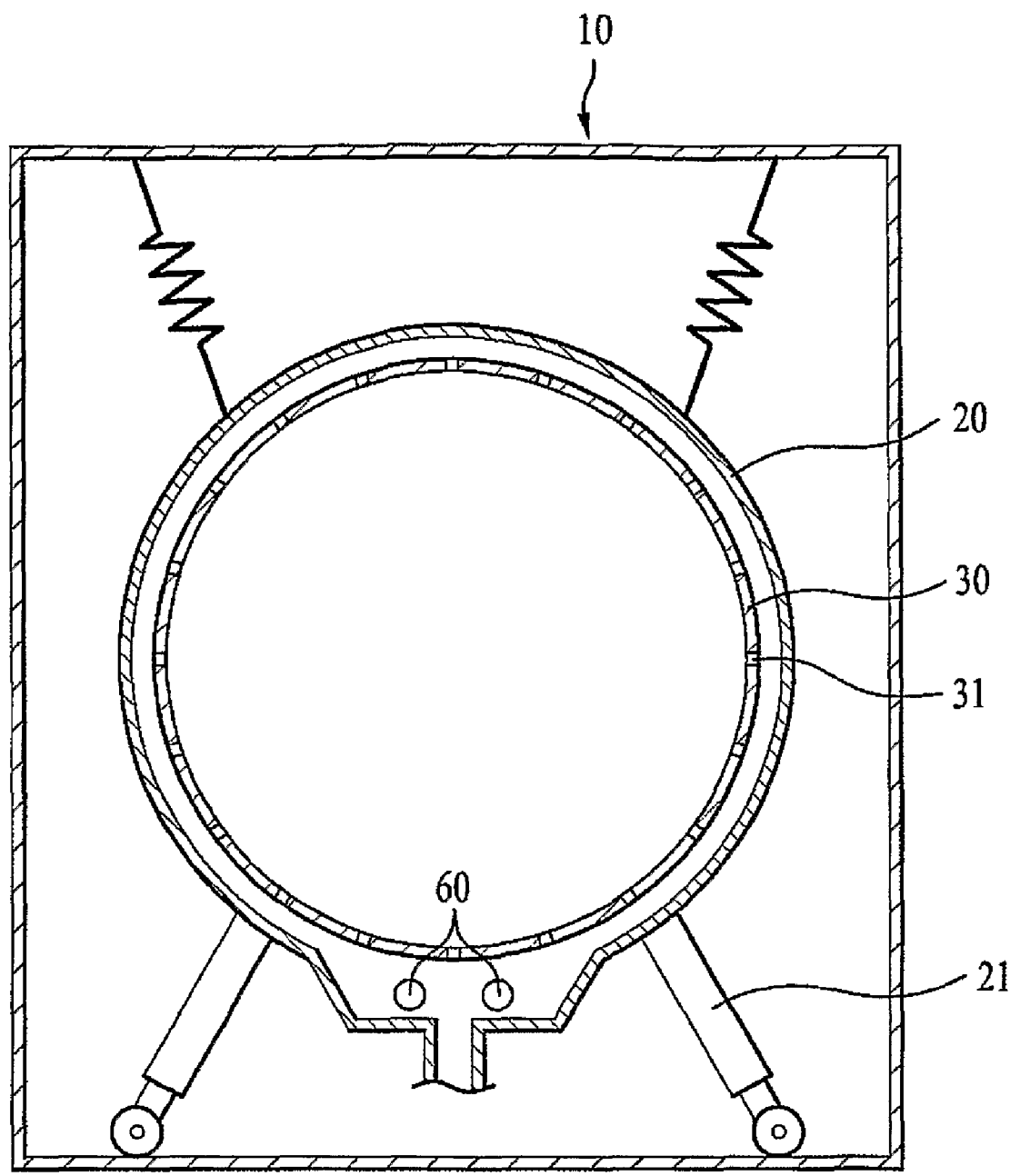

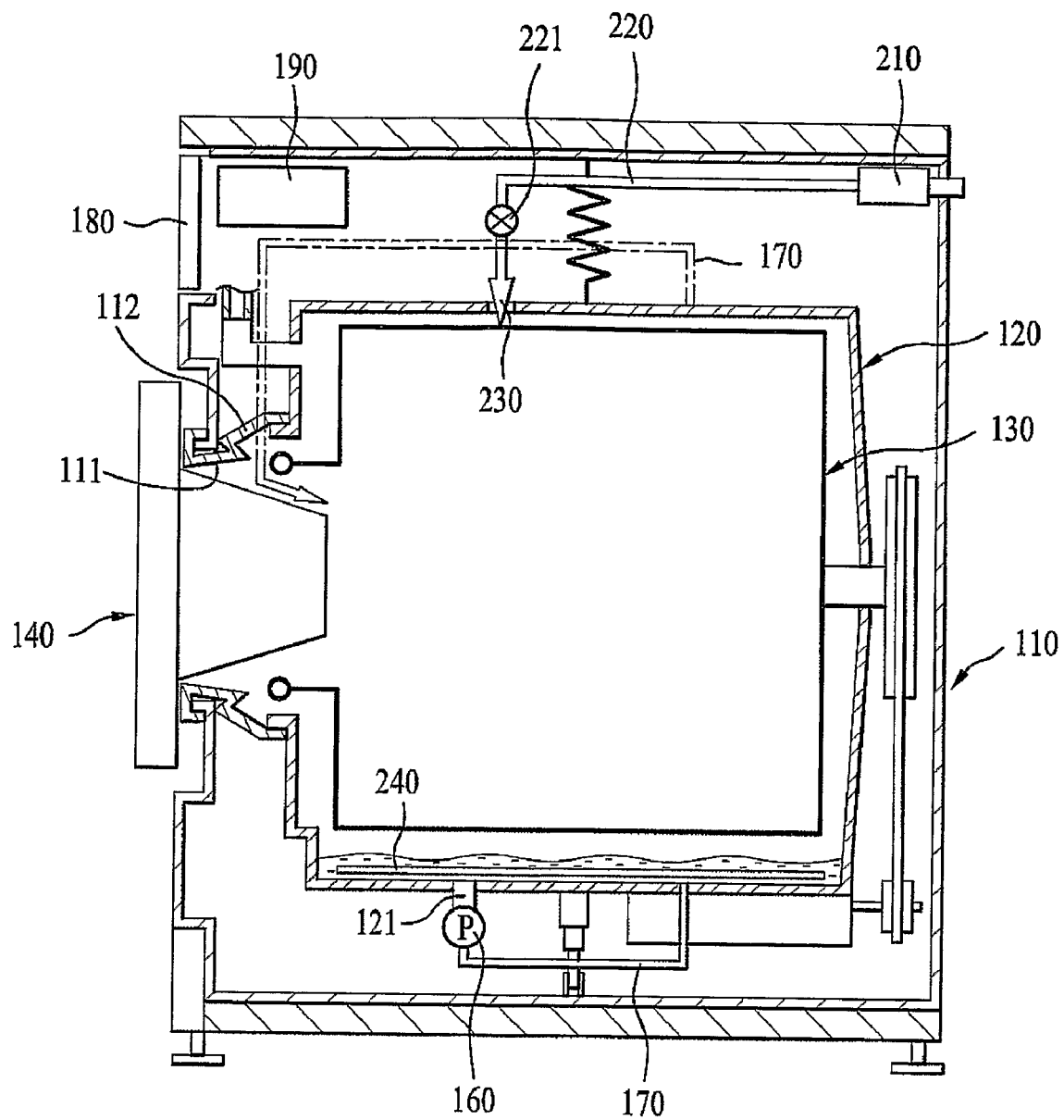
[Fig. 3]

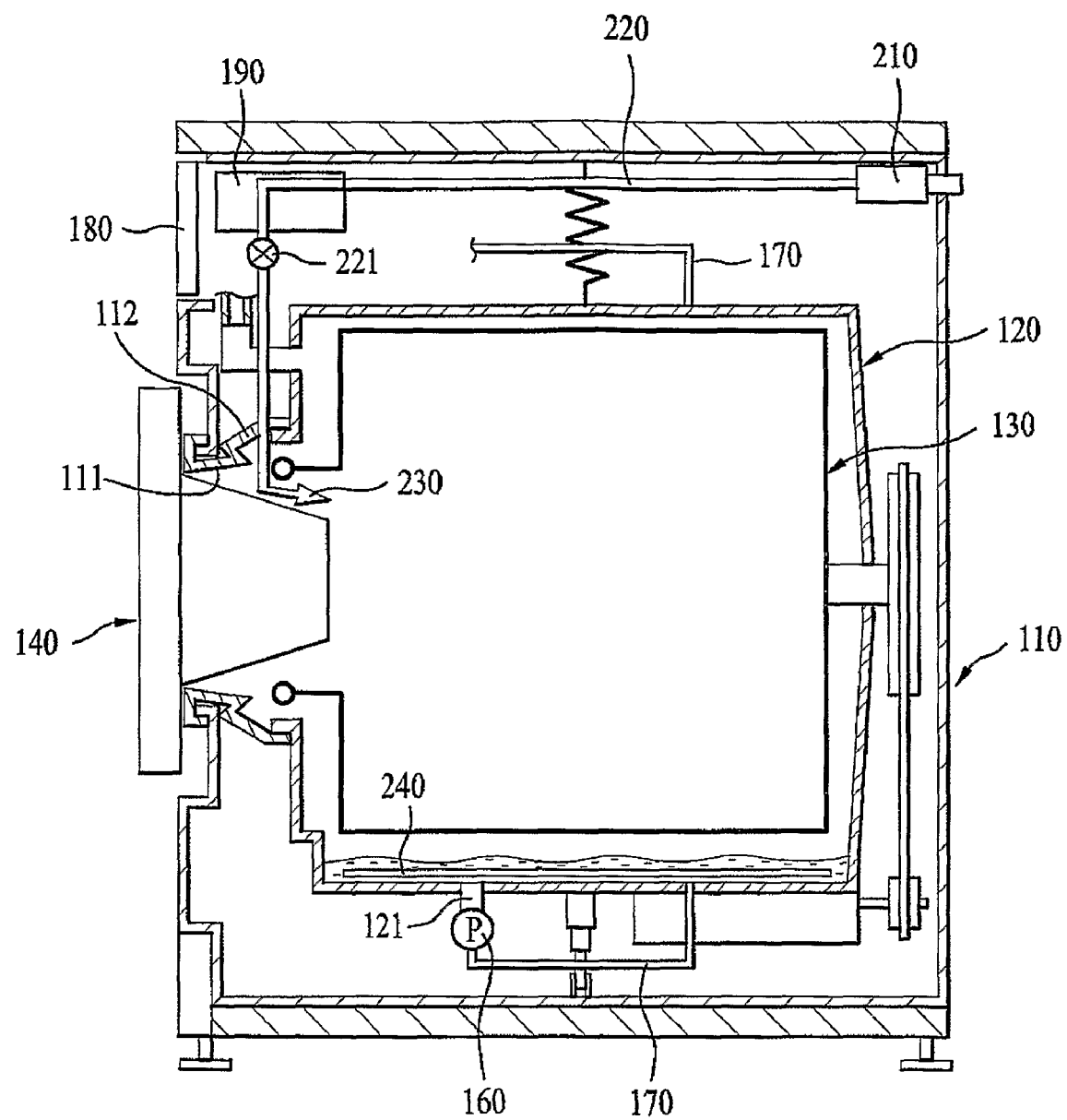
[Fig. 4]

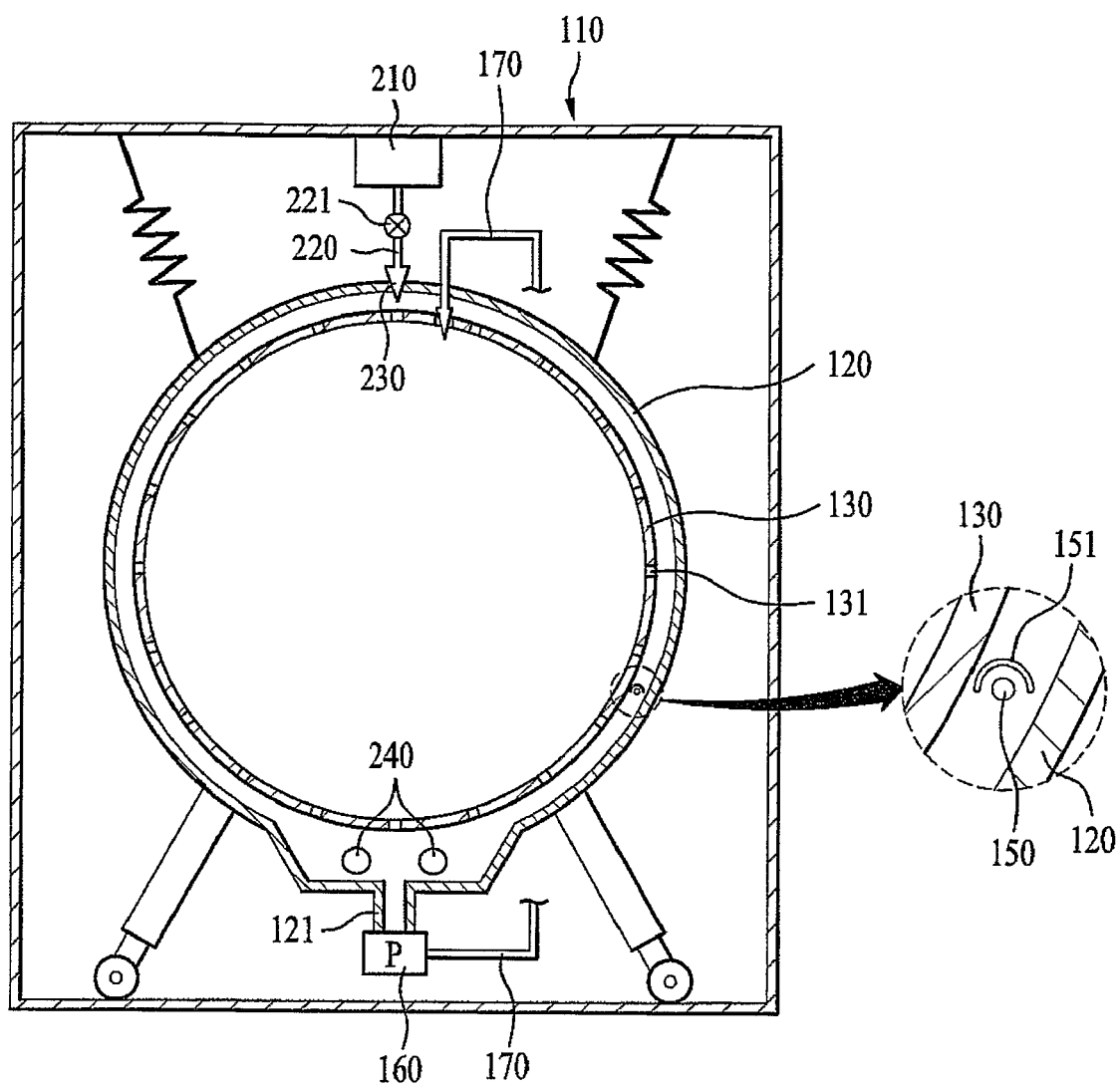
[Fig. 5]

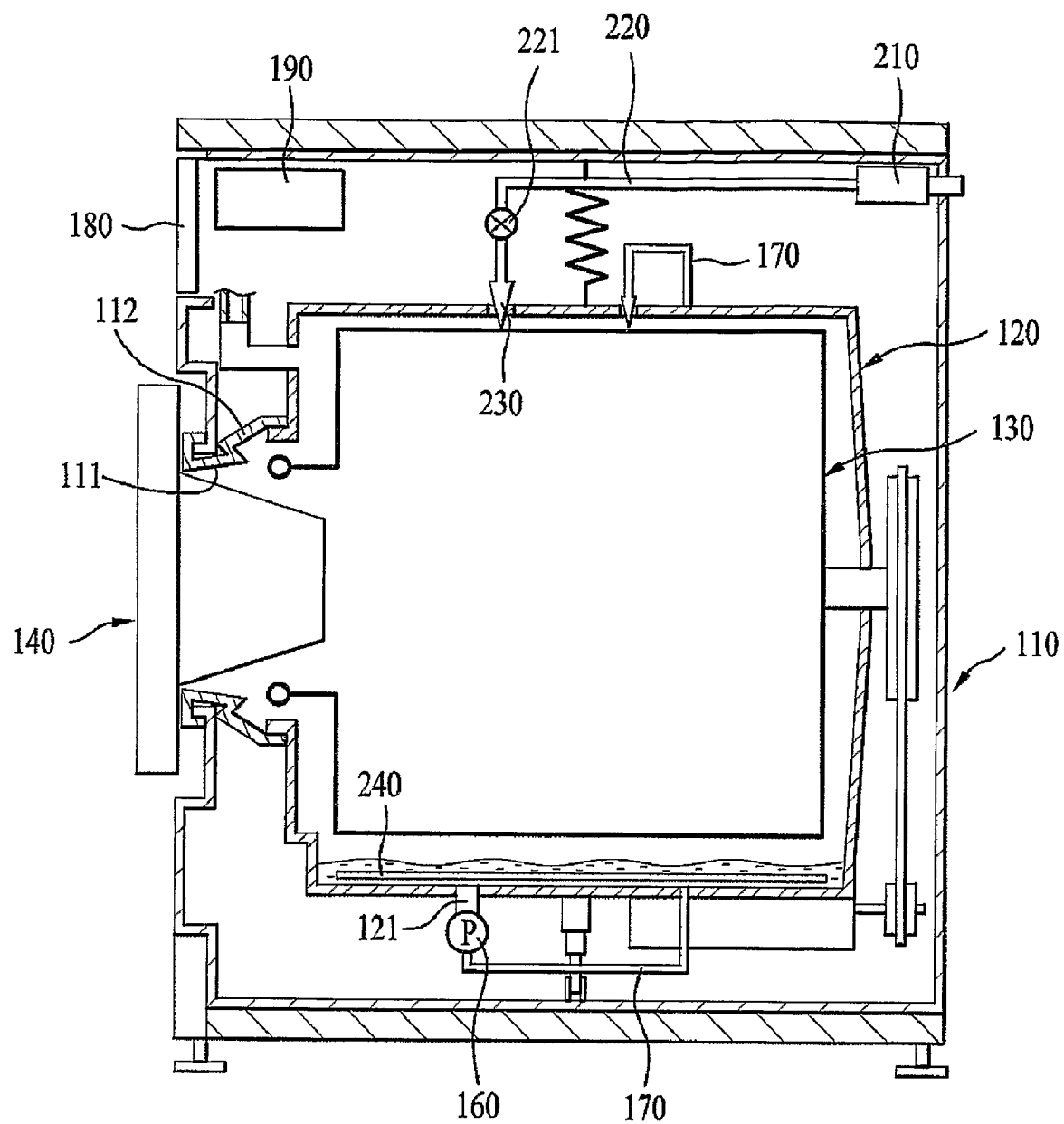
[Fig. 6]

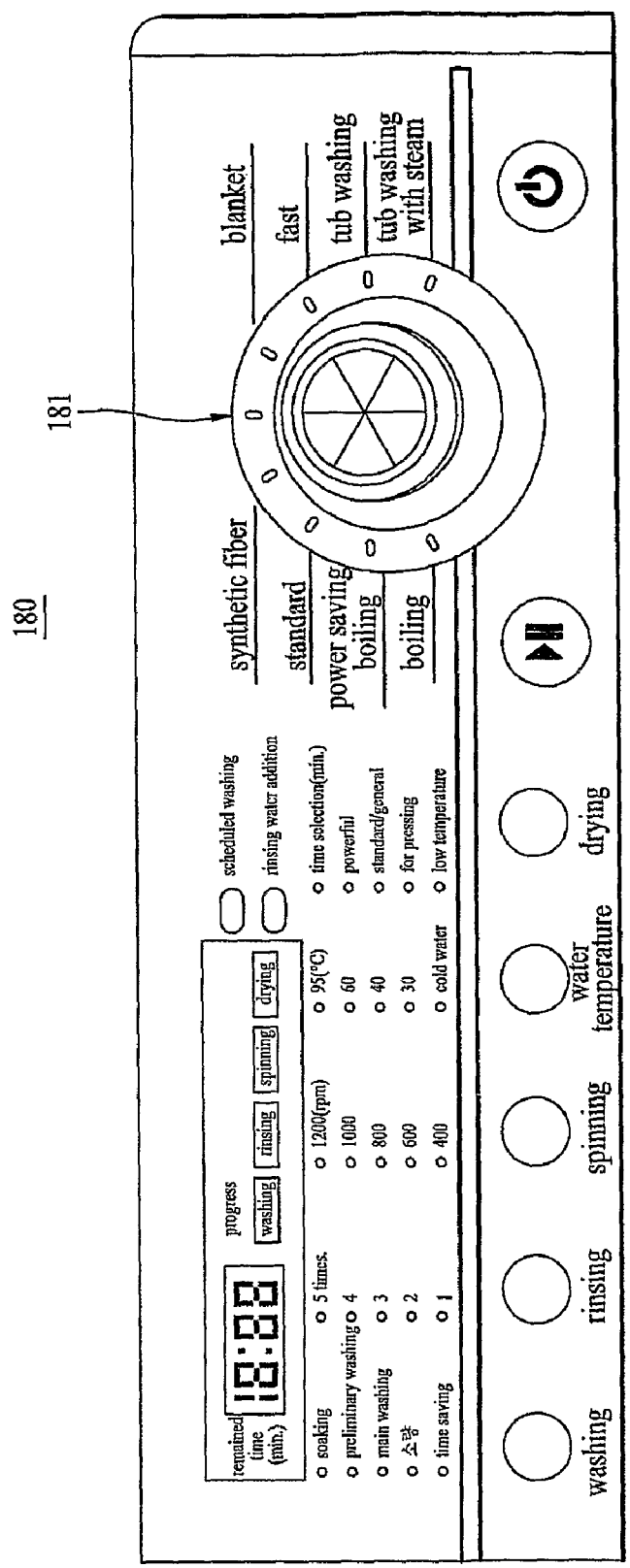
[Fig. 7]

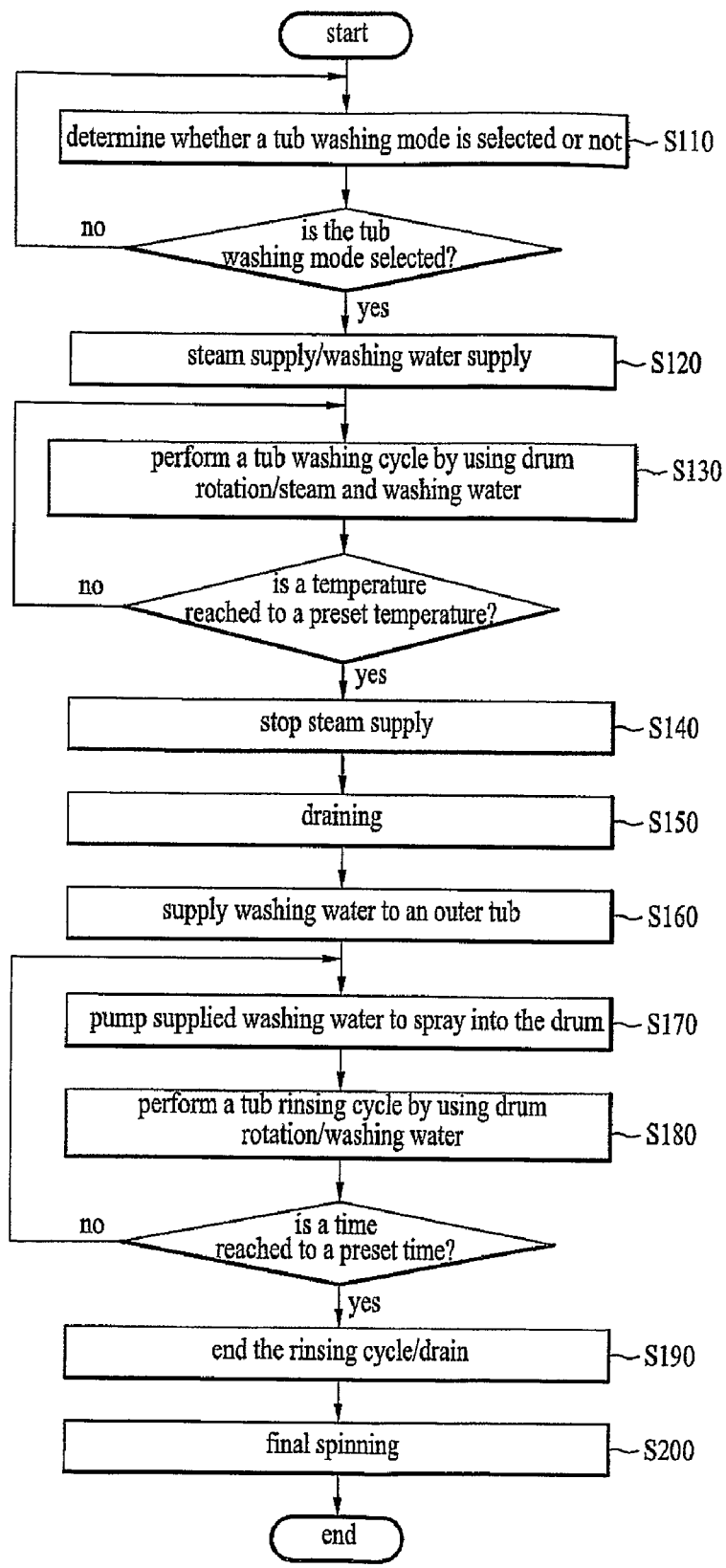
[Fig. 8]

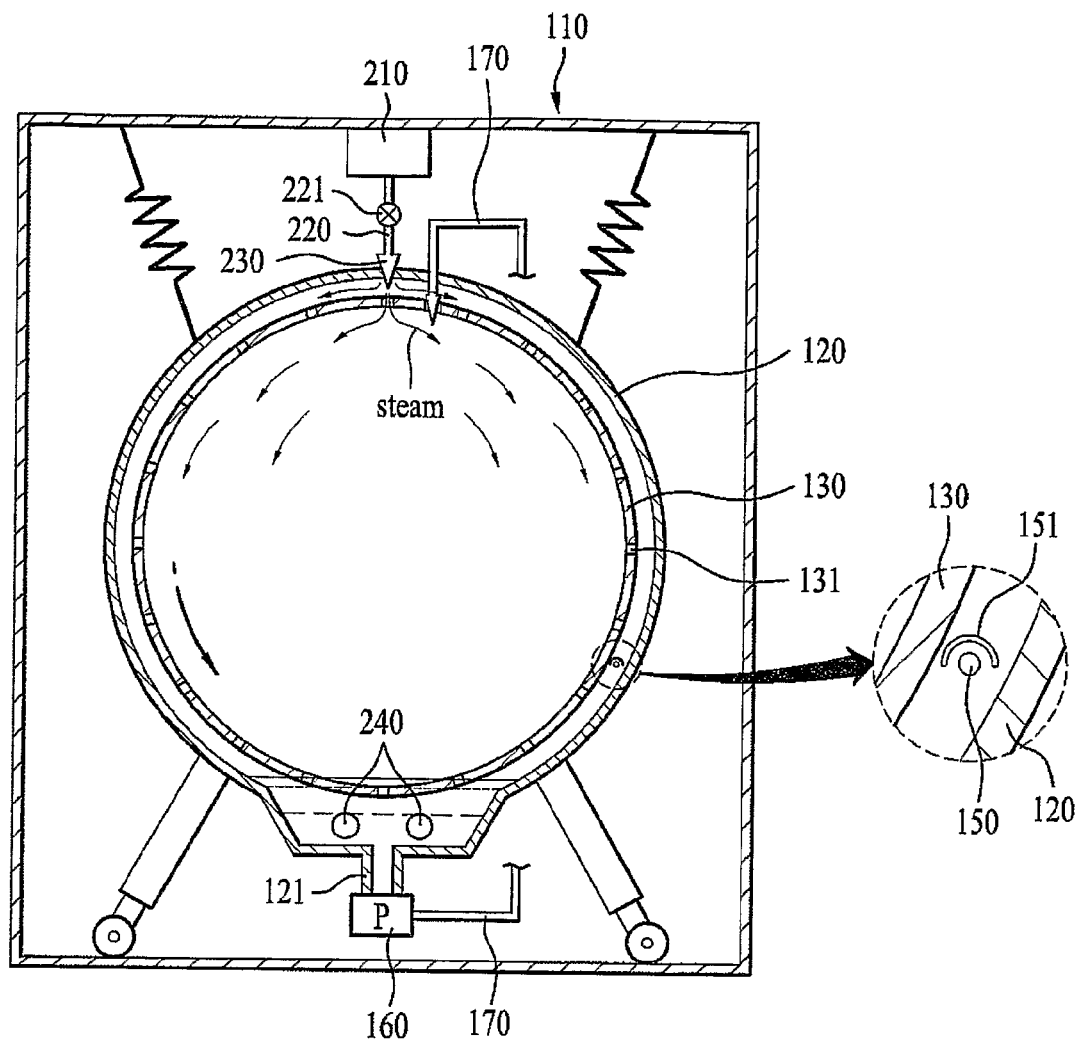
[Fig. 9]

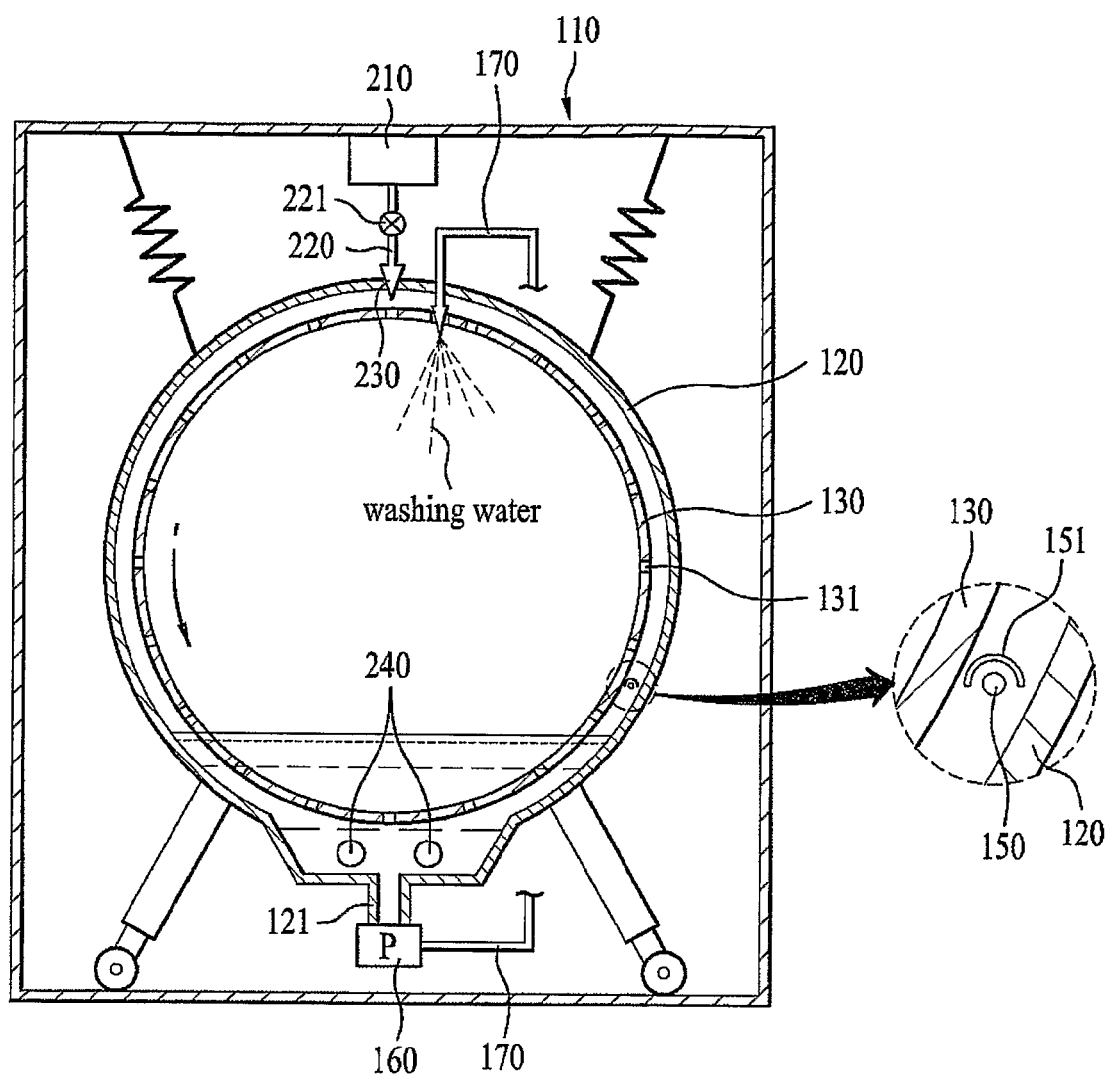
[Fig. 10]

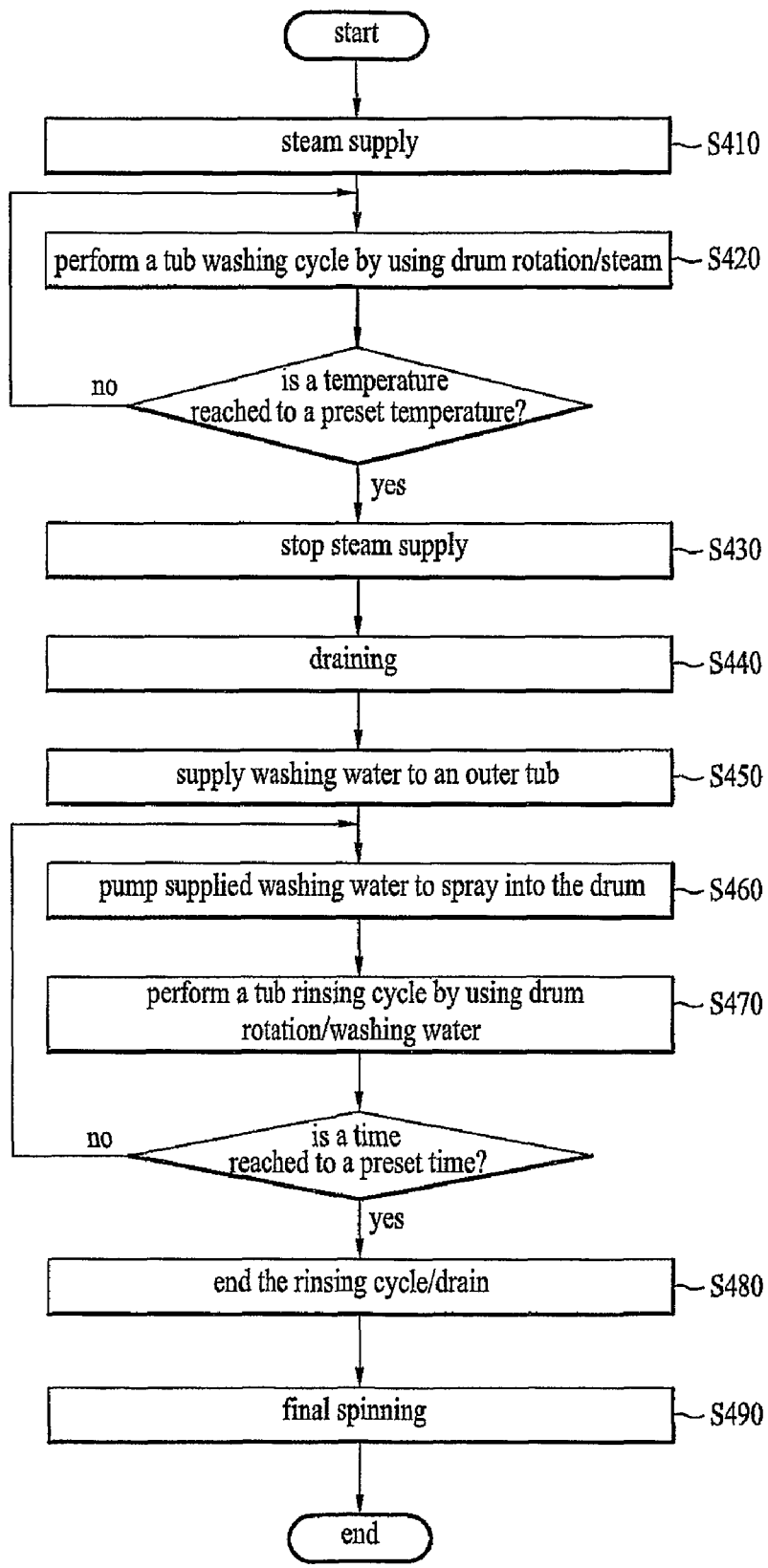
[Fig. 11]

[Fig. 12]
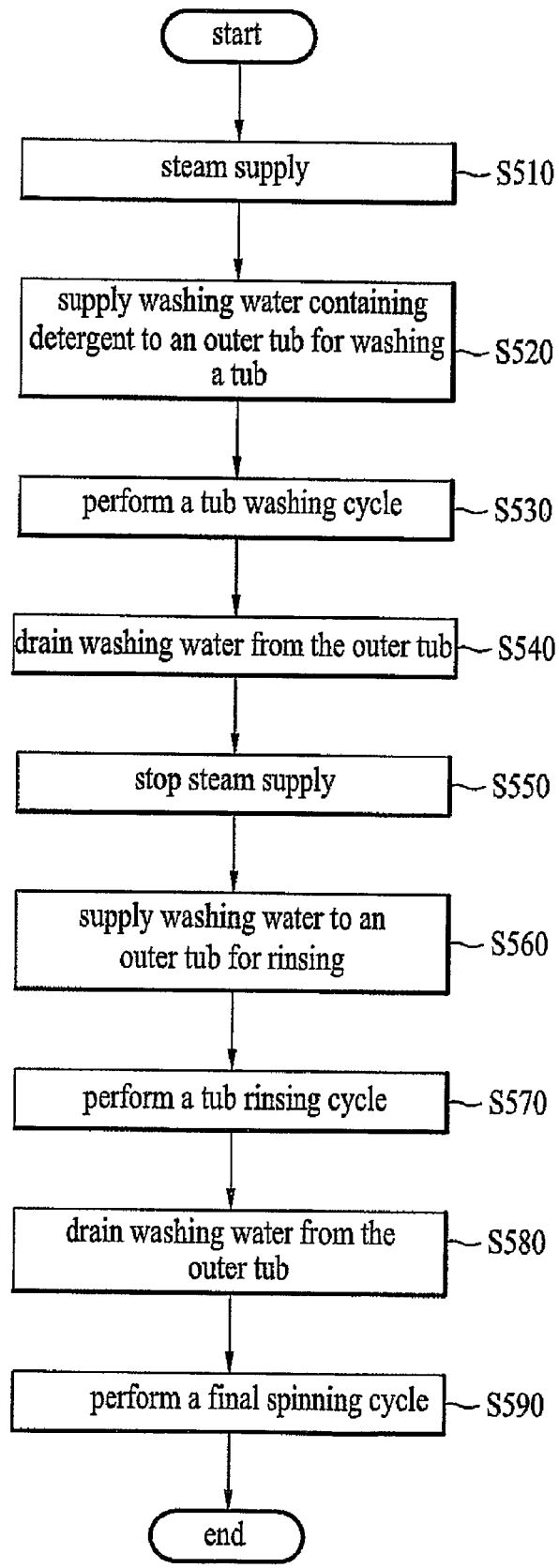

[Fig. 13]
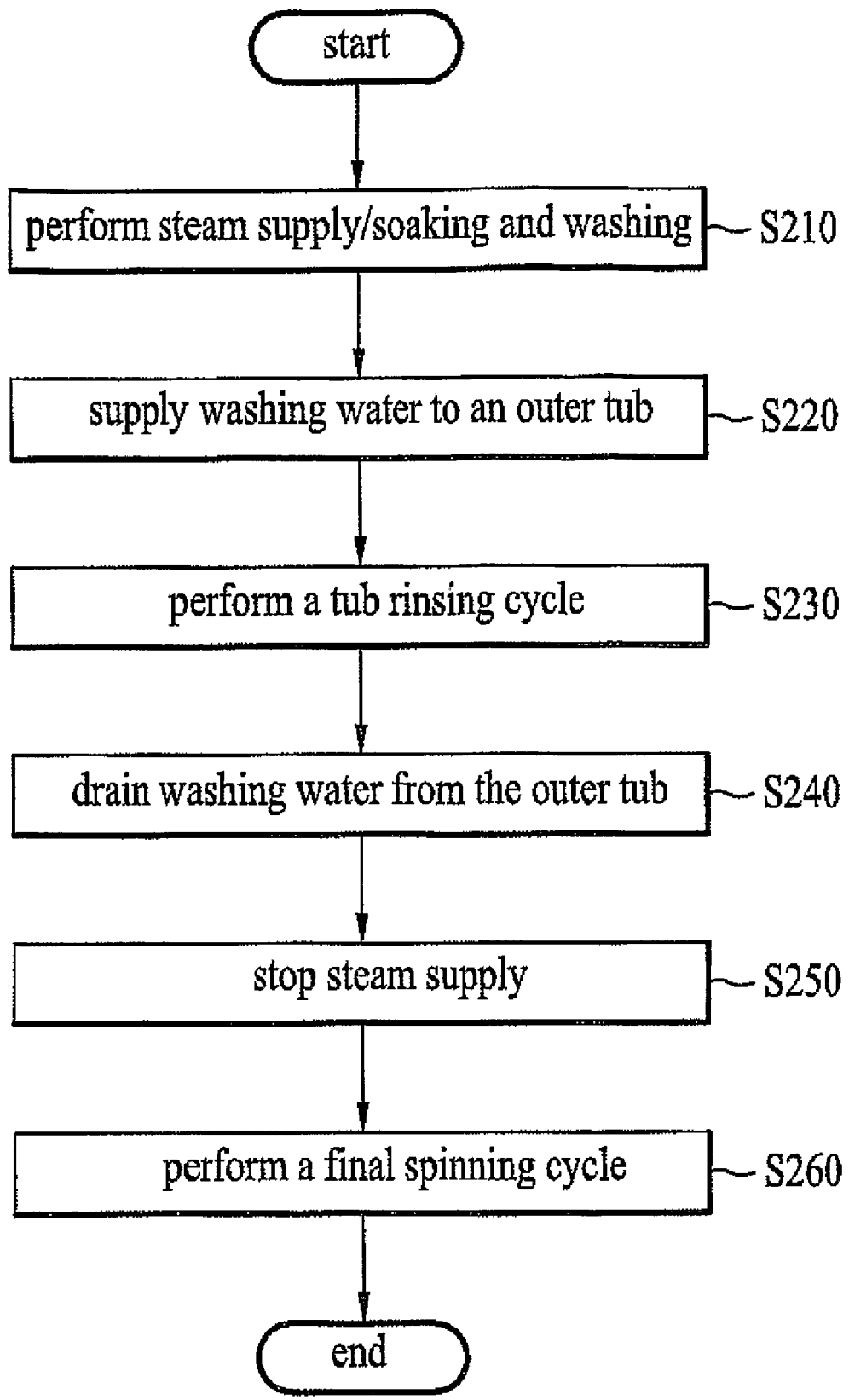

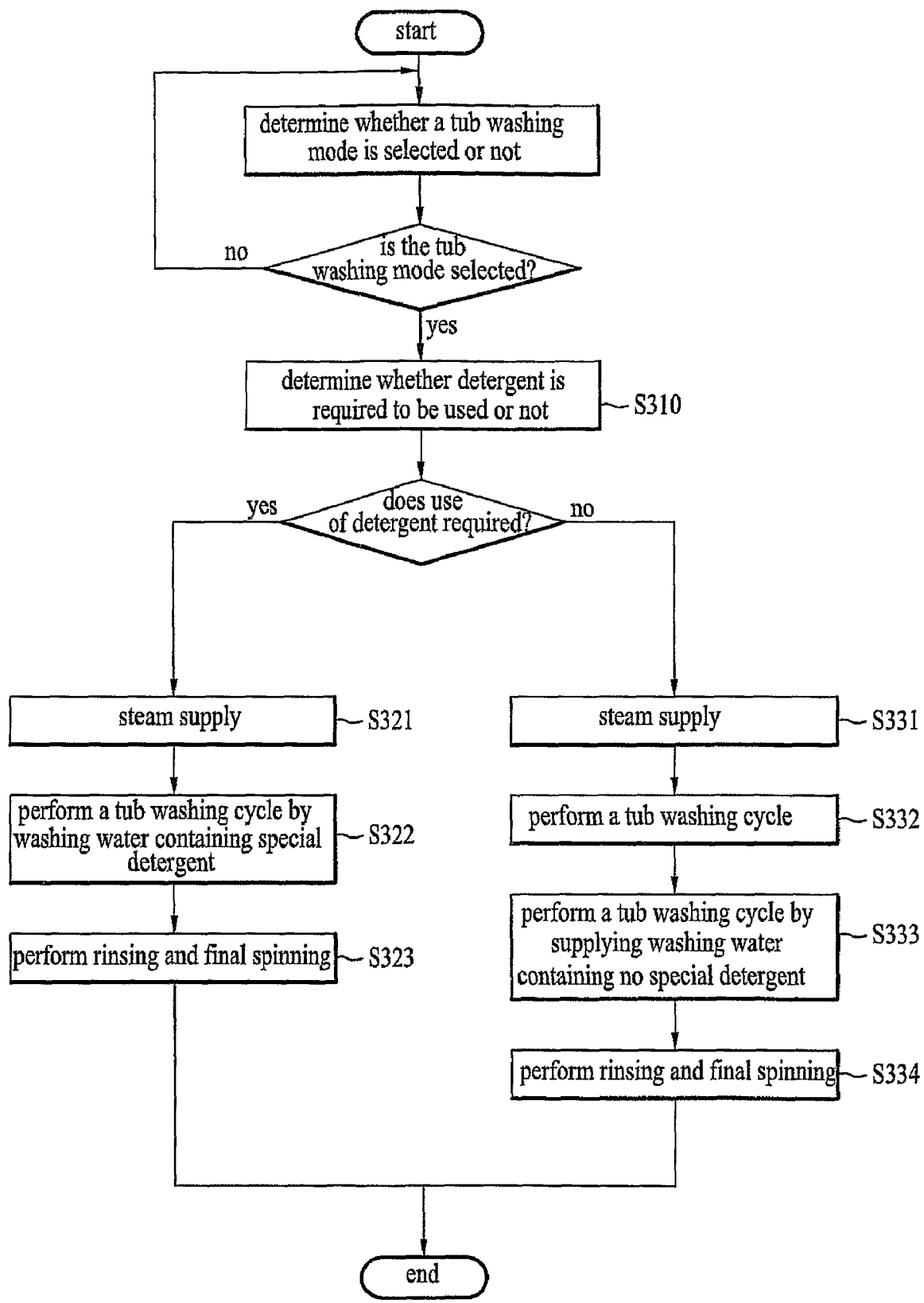
[Fig. 14]

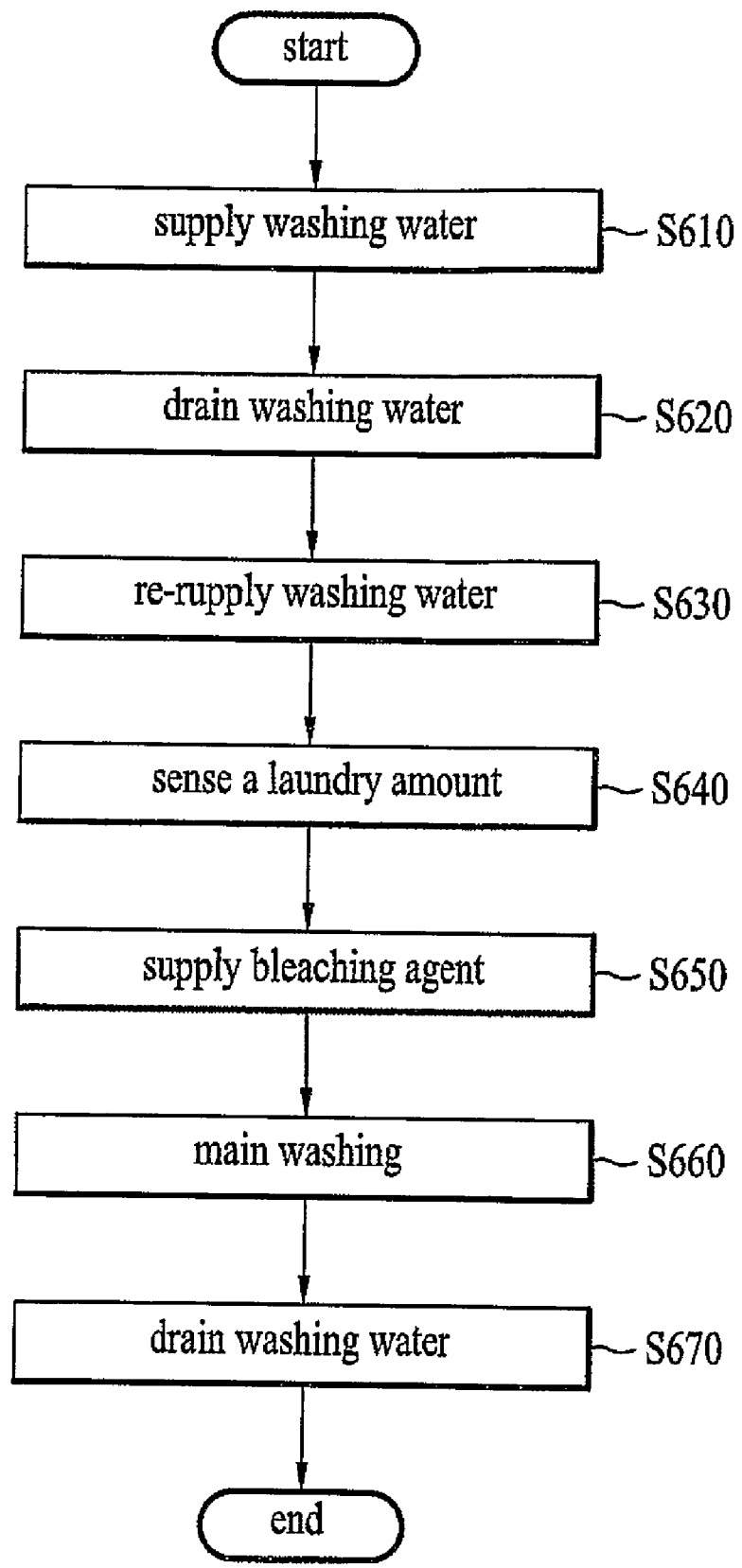
[Fig. 15]

WASHING A TUB OR A DRUM IN A WASHING MACHINE

This application claims priority to International application No. PCT/KR2005/004483 filed on Dec. 22, 2005, Korean Application No. 10-2005-0016063 filed on Feb. 25, 2005, Korean Application No. 10-2005-0016070 filed on Feb. 25, 2005, Korean Application No. 10-2005-0016068 filed on Feb. 25, 2005, Korean Application No. 10-2005-0035045 filed on Apr. 27, 2005, all of which are incorporated by reference, as if fully set forth herein.

TECHNICAL FIELD

The present invention relates to a method for washing a washing tub in a washing machine, and a washing machine having a washing tub washing course provided thereto for enabling washing tub washing by the same, and more particularly, to a method for washing with a washing machine which makes effective washing tub washing, with a small amount of washing water consumption, a low power consumption, and a high washing effect; and a washing machine having the same applied thereto.

BACKGROUND ART

In general, in the washing machines, there are a pulsator type washing machine having an upright drum, and a drum type washing machine having a drum laid down horizontally.

Because the drum type washing machine has the horizontal drum, the drum type washing machine performs washing by dropping down laundry.

FIGS. 1 and 2 each illustrates a related art drum type washing machine, schematically.

That is, the drum type washing machine is provided with a body 10, a tub 20 in the body 10, a drum 30 rotatably mounted in the tub 20, and a driving unit for driving the drum 30.

The body 10 has an introduction opening 11 in a front for introduction of laundry, with a door 40 at an edge of the introduction opening 11 for opening/closing the same.

There are dampers 21 on opposite sides of a lower portion of an outside circumference of the tub 20, to support the tub 20.

There is a washing water heater 60 on a lower portion of an inside of the tub 20, for enabling control of a temperature of the washing water.

The drum 30 is rotatably mounted in the tub 20, and has a plurality of pass through holes 31 in a circumferential surface for free flow of water therethrough.

The washing water can be supplied to the tub 20 through a detergent box 50, for supplying detergent or bleaching agent, together with the washing water.

The driving unit is provided with a driving motor 71 for driving the drum 30, and a belt 72 for transmission of driving power from the driving motor 71 to the drum 30.

The related art drum type washing machine washes laundry, in general, by performing a washing cycle, a rinsing cycle, and a spinning cycle for a preset time period automatically in response to control signals from a controller (not shown) in a state the laundry and the detergent is introduced in the drum 30.

In the meantime, regardless of kinds, the washing machine has dirt from the laundry, and remains and mixtures of the detergent and softener stuck to an inside wall of inside/outside walls of the drum 30, and an inside wall of the tub 20, to cause re-contamination of the laundry during washing, to impair reliability of the washing machine in view of hygiene.

Moreover, bad odor is produced from microbes, such as fungus on the dirt when the washing tub (tub or drum) is contaminated, to drop reliability of the washing machine in view of sanitary, too.

Eventually, a washing tub washing course has been developed recently, for removing various kinds of contaminants on the inside/outside walls of the drum 30 or on the inside wall of the tub to prevent the re-contamination.

The washing tub washing course will be described, briefly.

Upon selection of the washing tub washing course as a time for performing the same is due, the controller makes to supply the washing water to a water level substantially the same with the washing cycle together with washing tub cleaning detergent The drum 30 is kept rotating to perform the washing cycle.

According to this, the various kinds of contaminants is separated from the inside wall of the tub 20 or the inside/outside walls of the drum 30, to wash the tub or the drum, and as the washing water is drained, the separated contaminants are discharged from an outside of the washing machine.

When the draining is finished, new washing water containing no detergent is supplied to the tub 20, and, at the same time, the drum 30 is rotated, to perform the rinsing cycle.

Then, when the rinsing cycle is finished, the washing water is drained finally, and a spinning cycle is performed, to finish the washing tub washing course.

However, the related art washing tub washing course consumes an excessively large amount of the washing water, not only in the initial washing cycle, but also in the rinsing cycle, to result in waste of water and power, and in one aspect, the washing course is also not effective.

That is, the initial step of the washing tub washing course requires a large amount of washing water, because the dirt can be separated from the tub 20 or the drum 30 to a certain extent only when the drum is kept submerged in the washing water for a long time.

Moreover, since a temperature of the washing water is not high, the dirt can be separated smoothly only when the drum is kept submerged in the washing water for a long time. This long time submergence of the drum leads a time period required for the course substantially long.

Though the supply amount of the washing water can be reduced, if a condition for washing the tub 20 or the drum 30 is optimized by elevating an inside temperature of the drum adequately, in this case, because the heater (not shown) is required to generate heat for a long time for elevating the temperature inside of the drum, the case is not effective due to excessive power consumption.

In the meantime, if the washing tub washing is performed in a state the powder detergent is in the washing tub, the powder detergent produces much foam, to impede rotation of the washing tub, putting a load on the motor that rotates the washing tub, to cause a power loss at the end.

Moreover, the problems taken place in the related art method for washing a washing tub in a washing machine is not limited to the foregoing drum type washing machine, but applicable to the pulsator type washing machine having an upright drum, and to a washing machine only having a drum without the tub in the body as well as a washing machine having a tub and a drum in the tub.

The washing tub herein denotes a tub or a drum. That is, in a washing machine having both the tub and the drum, the washing tub herein denotes either the tub or the drum, or both the tub and the drum, and if the washing machine only has the drum without the tub, the washing tub herein denotes the drum.

DISCLOSURE OF INVENTION

Technical Problem

The object of the present invention is to provide a washing method and a washing machine which can wash a tub or a drum smoothly with reduced amount of washing water, and power consumption.

Another object of the present invention is to provide a washing method and a washing machine which is a better washing effect than the related art and effective.

Technical Solution

The object of the present invention can be achieved by providing a method for washing a tub or a drum in a washing machine having the tub the drum rotatably mounted in the tub, and a steam supply unit for supplying steam to the tub, including a steam supply step for supplying steam to the tub by using the steam supply unit.

The washing machine may further include a temperature sensor for sensing a temperature of at least one place of the tub, and the steam supply step includes the step of supplying the steam such that the temperature sensed at the temperature sensor is within a fixed range.

Preferably, the steam supply step includes the step of turning on/off supply of the steam so that the temperature is maintained within a fixed range for a preset time period.

The steam supply step may be performed appropriately for providing various effects, such as sterilizing or soaking the drum or the tub, performing washing only by using the steam, and the like. For an example, the steam may be supplied for sterilizing, or soaking before the main washing, enhancing a main washing effect during the main washing, or an effective performance of the rinsing in the rinsing step.

The steam supply step may include the step of rotating the drum. By this, the steam can be brought into contact with the drum comparatively uniformly. Because the steam diffuses, though the drum is not required to rotate, the steam can be brought into contact with a surface of the drum more effectively and quickly by rotating the drum. It is more effective since an air flow takes place if the drum rotates.

The rotation of the drum includes spin. The spin denotes rotation of the drum at a speed of which radial acceleration is greater than 1 G. In a case there is laundry in the drum, if the drum spins, the laundry is in close contact with a wall surface of the drum by centrifugal force.

The rotation of the drum may include tumble. In general, the tumble denotes rotation of the drum 130 at a low speed below a rotation speed at which the laundry is in close contact with an inside wall of the drum 130 by centrifugal force, i.e., a rotation speed of which radial acceleration is below 1 G, or rotation of the drum 130 at a low speed in opposite directions, alternately. The latter has, not only an effect of shaking the drum, to make the steam flow active enabling effective contact of the steam to a drum surface, but also an effect of shaking off the dirt from the drum surface.

The method may further include a washing water supply step for supplying washing water to the tub, a main washing step for washing the tub or the drum by using the washing water, and a draining step for draining the washing water. If the sterilizing and washing of the drum or the tub only with the steam is not adequate, the main washing step may be performed with the washing water, for better washing.

Depending on cases, if the tub or the drum does not require the performance of the main washing by using the washing water, the washing may be performed only with steam. For an example, the washing may be formed up to the main washing step once per a few months, and the washing only with steam may be performed in the middle of the main washing steps, to make an effective management of the tub or the drum.

In another aspect of the present invention, a method for washing a tub or a drum in a washing machine includes a washing water supply step for supplying washing water to a tub a draining step for draining the washing water supplied in the washing water supply step, a washing water re-supply step for supplying the washing water to the tub again, a laundry amount sensing step for determining existence of laundry in the washing machine, a bleaching agent supply step for supplying bleaching agent by supplying the washing water to the tub through a bleaching agent box, a main washing step for washing the tub or the drum by using the washing water and the bleaching agent, and a draining step for draining the washing water.

The washing machine further includes a circulating pump for circulating the washing water from the tub and further includes a washing water circulating step for circulating the washing water from the tub by using the circulating pump.

Alikely, the drum may be rotated in the washing water circulating step, and the rotation may be the tumble or the spin.

Rotation fashions of the drum may be combined, for a better effect.

Preferably, the circulating pump circulates the washing water by drawing the washing water from a lower side of the tub and discharging the washing water to an upper side of the tub. In this instance, it is more preferable that the washing water is discharged toward an outside wall of the drum.

Or, the circulating pump may circulate the washing water by drawing the washing water from a lower side of the tub and discharging the washing water to an inside of the drum, directly.

The washing water circulation by the circulating pump provides many kinds of good effects. For an example, even in a case a small amount of washing water is used, an effect the same with an effect in which a large amount of washing water is used can be provided. Particularly, in a case hot water is used, since a good washing effect can be provided even if not so much amount of hot water is used, it is favorable in view of energy efficiency. Even if washing water with a high temperature is used in the washing, the user will pay a small amount of energy cost.

In the washing water supply step, the drum is rotated, so that the washing water wets the drum uniformly and quickly, and an initial washing effect is provided. In the step, less sticky dirt can be washed from the drum or the tub.

Preferably, the steam supply step and the washing water supply step may be performed together, for reducing a total washing time period, and effects from the steam and the washing water can supplement each other.

The method may further include a washing water re-supply step for supplying washing water to the tub again after the washing water is drained from the tub, a rinsing step for rinsing the tub or the drum by using the washing water under re-supply, or re-supplied washing water, and a spinning step for rotating the drum at a high speed to extract water after draining the washing water from the tub.

By performing the rinsing step, the tub or the drum can be washed clean, finally.

The present invention is applicable to any type of washing machines as far as the application is against the object of the present invention. For an example, the present invention is applicable, not only to drum type washing machines or pulsator type washing machine each of which has a tub and a drum rotatably mounted in the tub, but also to washing machines only having a drum without the tub.

The "tub or drum" denote any one, or both of the tub and the drum.

Advantageous Effects

The present invention solves various problems in the related art described before, and, particularly, the tub washing can be made smoothly with small amount of washing water, and power consumption.

The use of steam enables many good effects, such as soaking is effective, other than the sterilizing effect.

The present invention provides a washing method and a washing machine which has a better washing effect than the related art, and effective in view of time and energy.

Besides, there can be a variety of effects of the present invention depending on embodiments.

BRIEF DESCRIPTION OF THE DRAWINGS

FIG. 1 illustrates a side section of a related art drum type washing machine;

FIG. 2 illustrates a front section of a related art drum type washing machine;

FIG. 3 illustrates a side section of a washing device in accordance with a preferred embodiment of the present invention;

FIG. 4 illustrates a side section of a washing device in accordance with another preferred embodiment of the present invention;

FIG. 5 illustrates a front section of a washing device in accordance with a preferred embodiment of the present invention;

FIG. 6 illustrates a side section of a washing device in accordance with another preferred embodiment of the present invention;

FIG. 7 illustrates a diagram of a control panel of a washing device in accordance with a preferred embodiment of the present invention;

FIG. 8 illustrates a flow chart showing the steps of a method for washing a washing tub in a washing device in accordance with a preferred embodiment of the present invention;

FIGS. 9 and 10 illustrate state diagrams each showing a method for washing a washing tub in a washing device in accordance with a preferred embodiment of the present invention;

FIGS. 11 to 15 illustrate embodiments of the present invention, respectively.

BEST MODE FOR CARRYING OUT THE INVENTION

Referring to FIGS. 3 and 5, the washing device in accordance with a preferred embodiment of the present invention includes a body 110, a tub 120, a drum 130, a steam supply unit, a temperature sensor 150, a circulating pump 160, a circulating flow passage 170, a control panel 180, and a control unit 190. A drum type washing machine is taken as an example for describing a preferred embodiment of the present invention.

The body 110 forms an exterior of the drum type washing machine, with an introduction opening 111 in a front, and the tub 120 is suspended in the body 110.

On a bottom of an inside of the tub 120, there is a washing water heater 240, for controlling a temperature of washing water.

In the vicinity of the introduction opening 111 of the body, there is a door 140 for opening/closing the introduction opening 111, and there is a rim portion 112 on an inside circumferential surface of the introduction opening 111 for sealing between the door 140 and the introduction opening 111.

There is a drain passage 121 connected to an underside of the tub 120 for draining the washing water.

The drum 130 is rotatably mounted in the tub 120, with an opened side positioned in a direction of the introduction opening 11 of the body 110.

There are a plurality of pass through holes 131 in a circumferential surface of the drum 130 for free flow of the washing water.

At least one steam supply unit is provided for supplying a predetermined amount of steam to the tub 120 or the drum 130.

The steam supply unit vaporizes water with heat, and supplies steam to the tub 120 or the drum 130, and includes a heat generating unit 210 for generating heat to vaporize water, and a steam supply pipe 220 for flow of steam produced by the heat generating unit 210.

The steam supply unit further includes a spray nozzle 230 for spraying the steam flowing through the steam supply pipe 220 to the tub or the drum 130.

Of course, referring to FIG. 4, an end of the spray nozzle 230 the steam is sprayed therethrough may be passed through the rim portion so as to be in communication with the inside of the drum 130, directly.

Particularly, in order to make selective spray of the steam available, it is preferable that the steam supply unit further includes a valve 221 on the steam supply pipe 220 for opening/closing the pipe.

The temperature sensor 150 is mounted at a portion of the inside of the tub 120 for sensing a temperature of the inside of the tub 120.

The temperature sensed at the temperature sensor 150 is used for controlling operation of the steam supply unit.

Particularly, for accurate temperature sensing, it is preferable that the temperature sensor 150 is not influenced by the steam provided to the inside of the tub 120 by the steam supply unit, directly.

Therefore, if is preferable that a cover 151 is provided on a side of the temperature sensor 150 opposite to a steam spray direction and an upper side thereof.

The circulating pump 160 is mounted on the drain passage 121 connected to the tub 120 for pumping and circulating the washing water supplied to the tub 120.

The circulating flow passage 170 is connected to the circulating pump 160 for guiding circulation of the washing water pumped by the circulating pump 160.

In this instance, a side through which the washing water is discharged, i.e., an end of the circulating flow passage 170, is passed through the rim portion 112 and directed to an inside wall of the drum 130.

Of course, referring to FIG. 6, the side through which the washing water is discharged, i.e., the end of the circulating flow passage 170, may be passed through the tub 120 and directed to an outside wall of the drum 130.

The control panel 180 is on an outside of the drum 130, and has a selection portion 181 for selection of a washing tub washing mode by using steam.

Referring to FIG. 7, the selection portion 181 may include a rotary knob for rotating to select an operation mode, or, though not shown, separate selection buttons.

Particularly, in the washing tub washing mode to be selected by the selection portion, there may be a washing tub washing mode in which the washing tub washing is performed only with the washing water, and a washing tub washing mode by using steam.

The control unit 190 is related to the control panel 180 and the temperature sensor 150. If the washing tub washing mode is selected at the control panel 180, the control unit 190 controls the steam supply unit and the temperature sensor 150 for performing the washing tub washing operation.

Of course, the control unit 190 controls other elements of the washing machine, such as the motor, the water supply valve, and so on.

A method for washing a washing tub by using the foregoing drum type washing machine in accordance with a preferred embodiment of the present invention will be described with reference to FIG. 8.

At first, the control unit 190 keeps noticing inputs through a selection portion 181 of the control panel 180 in a state connected to the control panel 180.

During the course, if it is noticed that the user selects the washing tub washing mode by using steam, the control unit 190 puts the steam supply unit into operation, to supply steam to the tub 120 or the drum 130, and controls the water supply valve to supply a required amount of washing water to the tub 120.

In this instance, the steam is produced as the heat generating unit 210 generates heat, and the steam produced thus passes through the steam supply pipe 220 and the spray nozzle 230 in succession, and is supplied to the tub 120 or the drum 130.

Referring to FIG. 9, it is the most preferable that a water level of the washing water supplied in above step is set to be in a range in which the washing water reaches to a lowest side surface of the drum 130, substantially.

This is for minimizing consumption of the washing water.

A washing effect can be improved even if the washing water amount is minimized because the high temperature, highly humid environment of the inside of the tub owing to the steam enables smooth separation of dirt from inside/outside walls of the drum 130 within a short time period.

According to this, the waste of washing water and time caused by the long time submergence of the entire drum 130 in the washing water for separation of the dirt is solved.

During the supply of the washing water, the control unit controls to rotate the drum 130.

In this instance, it is preferable that the drum 130 is rotated only in one direction at a speed lower than the speed of the washing cycle.

Of course, the drum 130 may be rotated at a speed the same with the speed of the washing cycle, or alternated, repeatedly.

However, taking it into account that the cycle is a cycle for tub washing, in order to provide a time period for the high temperature steam to react with dirt stuck to the surface of the drum 130 adequately, and to make the washing water to wet the drum smoothly, it is the most preferable that the drum 130 rotates at a low speed only in one direction.

Once the washing water supply is finished, a main washing cycle is performed.

In this instance, the main washing cycle is performed by running the drum 130 at a regular rotating speed, i.e., at a rotating speed the same with a general washing cycle, for a predetermined time period in opposite directions alternately.

That is, the main washing is performed (S130) by forming the environment of the inside of the tub 120 or the drum 130 to be high temperature and highly humid by using the high temperature and the moisture of the steam, and by rotating the drum 130 continuously.

In this instance, it is preferable that the drum 130 is rotated at a speed faster than the rotation speed at the time of the steam supply and the washing water supply, but substantially the same rotation speed at the time of a general washing cycle in opposite directions alternately.

Of course, the drum 130 may be rotated only one direction.

Such a rotation of the drum 130 enables uniform spray of the steam throughout the drum 130, thereby providing uniform sterilizing and washing effects.

At the end, by the foregoing series of steps, washing of the inside/outside walls of the drum 130 is made.

In the meantime, the steam supply to the tub 120 in the middle of the washing cycle is kept until the temperature inside of the tub 120 reaches to a preset temperature range.

Though the preset temperature range is in a range of 60° C.~100° C., it is preferable that the temperature is high enough to sterilize microbes on the inside wall of the tub 120 or the inside/outside walls of the drum 130, i.e., higher than 80° C.

Of course, the temperature may be set to be a range higher than 60° C. at which the dirt is separated smoothly from the inside wall of the tub 120 or the inside/outside walls of the drum 130.

If the inside of the tub 120 or the drum 130 reaches to above temperature range, operation of the steam supply unit is stopped (S140), i.e., the heat generation of the heat generating unit 210 is stopped.

Of course, taking it into account that the inside of the tub 120 or the drum 130 can be maintained in an environment favorable for washing the tub even if operation of the operation of the steam supply unit is stopped, the drum 130 may be rotated continuously for continuing the main washing cycle.

In the meantime, once the tub washing cycle for the tub 120 or the drum 130 is finished by the foregoing series of steps, rotation of the drum 130 is stopped, and water from the steam, i.e., the washing water containing dirt is drained from the tub 120 (S150).

Of course, the amount of the washing water containing dirt is not so much, the drain may not be performed, but the method may proceed to the next step.

Once the drain is finished, a predetermined amount of washing water is supplied to the tub 120 by the controller (S160).

In this instance, referring to FIG. 10, it is preferable that a water level of the washing water supplied in this time is enough to circulate for a preset time period by the circulating pump 160.

The preset time period is a time period in which the rinsing cycle is made for rinsing the tub 120 or the drum 130 by using the washing water.

Moreover, it is preferable that the drum 130 is kept rotating while the washing water is supplied, for washing dirt remained on the surface of the drum 130.

In this instance, it is preferable that the drum 130 is rotated at a speed lower than the rotation speed at the time of the washing cycle of the washing course, only in one direction.

Of course, the drum 130 may be rotated at a rotation speed the same with the rotation speed of the washing cycle, or rotated in opposite directions, alternately.

However, taking it into account that the cycle is for rinsing, it is the most preferable that the drum 130 is rotated at a low speed only in one direction for adequate removal of the dirt from the surface of the drum 130.

When the washing water supply is finished, washing of the dirt from the drum 130 or the tub 120, i.e., an actual rinsing cycle is performed.

The rinsing cycle is made by controlling operation of the circulating pump 160.

That is, by controlling operation of the circulating pump 160, washing water pumping to the tub is made, and the pumped washing water flows along the circulating flow passage 170 and sprayed into the drum 130 (S170), thereby rinsing dirt from the inside wall of the drum 130.

Moreover, in the rinsing cycle too, the rotation of the drum 130 is controlled, such that the drum 130 is rotated at a regular rotation speed for a preset time period, i.e., at a rotation speed the same with a general washing cycle in opposite directions alternately, to perform an actual rinsing cycle (S180).

The preset time period is a time period shorter than a time period required for the tub washing by using steam, preferably in a range of 3~7 minutes.

At the end, by the rotation of the drum 130 and the spray of the washing water, rinsing of the inside/outside walls of the drum 130 is made.

When a progressed time period of the rinsing cycle reaches to a preset time period, rotation of the drum 130 is stopped, and operation of the circulating pump 160 is stopped, and the washing water is drained from the tub 120 (S190), to finish the tub washing node.

However, there may be a small amount of dirt on the wall of the drum 130 or the wall of the tub 120 if the tub washing mode is finished by the draining of the washing water after finishing the rinsing cycle.

Therefore, the embodiment of the present invention suggests performing a final spinning cycle (S200) in which, when the draining of the washing water is finished, the drum 130 is rotated at a high speed for discharging dirt remained in the drum 130, completely.

In this instance, the small amount of dirt is swept away from the inside wall surface of the tub 120 by the washing water spouting toward an outside of the drum by the high speed rotation of the drum 130.

In the meantime, the operation method of the tub washing mode in accordance with an embodiment of the present invention is not necessarily limited to the steps of the foregoing embodiment.

For an example, not only the washing water can be sprayed into the drum by controlling the circulating pump in the middle of the tub washing cycle by using steam, but also the steam may be supplied into the drum by controlling the steam generating unit in the middle of the rinsing cycle.

In conclusion, the method for washing a washing tub in a washing machine of the present invention is not limited to the foregoing embodiments, but is applicable, not only to the drum type washing machine, but also to a general pulsator type washing machine.

MODE FOR THE INVENTION

Another preferred embodiment of the present invention will be described with reference to FIG. 11.

When the user selects a tub washing mode, the controller which controls operation of the washing machine puts a steam supply unit into operation, to supply steam to the tub 120 or the drum 130 (S410).

While the steam is supplied to the tub 120 or the drum 130, the controller controls to rotate the drum 130 continuously, for performing the tub washing cycle (S420), actually.

HHHH That is, That is, the tub washing cycle is performed by forming the environment of the inside of the tub 120 or the drum 130 to be high temperature and highly humid by using the high temperature and the moisture of the steam, and by rotating the drum 130, continuously.

In this instance, it is preferable that the drum 130 is rotated at a rotation speed the same with, or lower than a rotation speed at the time of a washing cycle only in one direction.

Of course, the drum 130 may be rotated in opposite directions, alternately.

Such a continuous rotation of the drum 130 enables uniform spray of the steam throughout the drum 130, thereby providing uniform sterilizing and washing effects.

In the meantime, the steam supply is continued until the temperature inside of the tub 120 or the drum 130 reaches to a preset temperature range.

Though the preset temperature range is in a range of 60° C.~100° C., it is preferable that the temperature is high enough to sterilize microbes on the inside wall of the tub 120 or the inside/outside walls of the drum 130, i.e., higher than 80° C.

Of course, the temperature may be set to be a range higher than 60° C. at which the dirt is separated smoothly from the inside wall of the tub 120 or the inside/outside walls of the drum 130.

If the inside of the tub 120 or the drum 130 reaches to above temperature range, operation of the steam supply unit is stopped (S430), i.e., the heat generation of the heat generating unit 210 is stopped.

Of course, taking it into account that the inside of the tub 120 or the drum 130 can be maintained in an environment favorable for washing the tub even if operation of the operation of the steam supply unit is stopped, the drum 130 may be rotated continuously for continuing the main washing cycle.

In the meantime, once the tub washing cycle for the tub 120 or the drum 130 is finished by the foregoing series of steps, rotation of the drum 130 is stopped, and water from the steam, i.e., the washing water containing dirt is drained from the tub 120 (S440).

Of course, the amount of the washing water containing dirt is not so much, the drain may not be performed, but the method may proceed to the next step.

Once the drain is finished, a predetermined amount of washing water is supplied to the tub 120 by the controller (S450).

In this instance, it is preferable that a water level of the washing water supplied in this time is enough to circulate for a preset time period by the circulating pump 160.

The preset time period is a time period in which the rinsing cycle is made for rinsing the tub 120 or the drum 130 by using the washing water.

Moreover, it is preferable that the drum 130 is kept rotating while the washing water is supplied, for washing dirt remained on the surface of the drum 130.

In this instance, it is preferable that the drum 130 is rotated at a speed lower than the rotation speed at the time of the washing cycle, only in one direction.

Of course, the drum 130 may be rotated at a rotation speed the same with the rotation speed of the washing cycle, or rotated in opposite directions, alternately.

However, taking it into account that the cycle is for rinsing, it is the most preferable that the drum 130 is rotated at a low speed only in one direction for adequate removal of the dirt from the surface of the drum 130.

When the washing water supply is finished, a rinsing cycle which is washing of the dirt from the drum 130 and the tub 120 is performed.

The rinsing cycle is made by controlling operation of the circulating pump 160.

That is, by controlling operation of the circulating pump 160, washing water pumping to the tub is made, and the pumped washing water flows along the circulating flow passage 170 and sprayed into the drum 130 (S460), thereby rinsing dirt from the inside wall of the drum 130.

Moreover, in the rinsing cycle too, the rotation of the drum 130 is controlled, such that the drum 130 is rotated at a regular rotation speed for a preset time period, i.e., at a rotation speed the same with a general washing cycle in opposite directions, alternately.

The preset time period is a time period shorter than a time period required for the tub washing by using steam, preferably in a range of 3~7 minutes.

At the end, by the foregoing series of steps, rinsing of the inside/outside walls of the drum 130 is made (S470).

When a progressed time period of the rinsing cycle reaches to a preset time period, rotation of the drum 130 is stopped, and operation of the circulating pump 160 is stopped, and the washing water is drained from the tub 120 (S480), to finish the tub washing mode.

However, there may be a small amount of dirt on the wall of the drum 130 or the wall of the tub 120 if the tub washing mode is finished by the draining of the washing water after finishing the rinsing cycle.

Therefore, the embodiment of the present invention suggests performing a final spinning cycle (S490) in which, when the draining of the washing water is finished, the drum 130 is rotated at a high speed for discharging dirt remained in the drum 130, completely.

In this instance, the small amount of dirt is swept away from the inside wall surface of the tub 120 by the washing water spouting toward an outside of the drum by the high speed rotation of the drum 130.

Another preferred embodiment of the present invention will be described with reference to the flow chart in FIG. 12.

At first, if the user selects a tub washing mode, a controller (not shown) which controls operation of a washing machine put a steam supply unit into operation to supply steam to a tub 120 or a drum 130 (S510).

In this instance, the steam is generated as a heat generating unit generates heat, and the steam produced thus passes through a steam supply pipe 220 and a spray nozzle 230 in succession, and supplied to the tub 120 or the drum 130.

The steam is supplied such that a temperature inside of the tub 120 or the drum 130 is maintained at a preset temperature range, by controlling operation of the steam supply unit, i.e., by repeating turn on/off of the operation (heat generation) of the heat generating unit 210.

It is preferable that the preset temperature range is 60° C.~100° C. The temperature range is a range in which dirt can be separated smoothly from the inside wall of the tub 120 or the inside/outside walls of the drum 130. The temperature is sensed at a temperature sensor 190.

Especially, since the temperature range is a range in which microbes or the like on the inside wall of the tub 120 or the inside/outside walls of the drum 130 can be sterilized, a sterilizing effect can also be obtained.

During the steam is supplied, the predetermined amount of washing water is supplied to the tub 120 under the control of the controller (S520).

The washing water is supplied through a detergent box 50 (see FIG. 1) to carry detergent in the detergent box 50 for washing the washing tub.

Referring to FIG. 9, it is the most preferable that a water level of the washing water supplied thus is set to be in a range enough to reach to a lowest surface of the drum 130.

It is preferable that the drum 130 is kept rotating while the washing water is supplied.

In this instance, it is preferable that the drum 130 is rotated at a speed lower than a rotation speed at the time of the washing cycle only in one direction.

Of course, the drum 130 may be rotated at a speed the same with a rotation speed of the washing cycle, or rotated in opposite directions, alternately.

However, taking it into account that the cycle is a cycle for tub washing, it is the most preferable that the drum 130 is rotated only in one direction at a low speed for providing the detergent in the washing water with an adequate time period for reacting with the dirt on the surface of the drum 130.

Then, if the washing water supply is finished, an actual tub washing is performed (S530).

In the tub washing cycle, the drum 130 is rotated in opposite directions alternately for a predetermined time period at a regular rotation speed, i.e., at a rotation speed the same with a general washing cycle.

At the end, by above series of steps, washing for the inside/outside walls of the drum 130 is made.

After the series of tub washing cycle is progressed for the predetermined time period, the washing water is drained from the tub 120 (S540).

In this instance, the washing water draining thus contains dirt separated from the inside/outside walls of the drum 130. Of course, the method may proceed to the next step directly without performing the draining of the washing water.

Upon finishing the draining of the washing water, a rinsing cycle is performed (S570) in a state washing water is supplied again for performing the rinsing cycle (S560).

Of course, it is more preferable that a spinning cycle is performed before the rinsing cycle is performed, for smoother discharge of dirt remained on the inside/outside walls of the drum 130.

It is preferable that new washing water containing no detergent for washing the washing tub is used in the rinsing cycle.

Particularly, it is preferable that, in the step of supplying washing water for performing the rinsing cycle, the drum 130 is rotated at a low speed, for smooth washing of the dirt remained on the inside/outside walls of the drum 130.

Moreover, it is preferable that a water level of the washing water supplied in the rinsing cycle is higher than a water level of the washing water supplied in the washing cycle, i.e., more than an amount of the washing water supplied in the washing cycle.

This is for enabling maximum dilution of detergent remained on the inside/outside walls of the drum 130, as well as smooth removal of the dirt from the inside wall of the tub 120.

In this instance, since the dirt stuck to the inside wall of the tub 120 is in a state separated from the inside wall of the tub 120 by the high temperature steam at the time of the washing cycle, by making an amount of the washing water splashed to the inside wall of the tub 120 to be maximum by the high speed rotation of the drum in the final spinning cycle to be described later, removal of the dirt from the inside wall of the tub 120 becomes more smoother.

In this instance, referring to FIG. 10, it is preferable that the water level of the washing water supplied in the rinsing cycle is maintained such that a portion substantially at least 1/5 to 1/3 (preferably in a range of 1/4) of a total height of the drum 130 from the lowest surface of the drum 130 is submerged. The water level is a maximum water level which enables smooth dilution of the remained detergent and smooth removal of the remained dirt without consumption of an excessive amount of water.

Upon finishing above series of rinsing cycle, a final draining is performed (S580), and a final spinning is performed (S590), to finish operation of the tub washing mode.

In the meantime, in above series of steps, it is preferable that the operation of the steam supply unit is stopped before supply of new washing water for performing the rinsing cycle (or, before starting the draining cycle after finish of the washing cycle) (S550).

This is for minimizing power consumption because maintenance of the high temperature, highly humid environment of the drum 130 does not affect a tub washing performance in the rinsing cycle.

Of course, the operation of the steam supply unit may be stopped after entire tub washing mode is finished In the meantime, different from above embodiment, if no detergent is used, the tub washing mode ray be performed in other form of control.

FIG. 13 illustrates an example of a tub washing mode in a case no detergent is used, referring to which another preferred embodiment of the present invention will be described.

At first, if the user selects a tub washing mode, a controller which controls operation of a washing machine puts a steam supply unit into operation to supply steam to a tub 120 or a drum 130 (S210).

The steam is supplied such that a temperature inside of the tub 120 or the drum 130 is maintained at a preset temperature range, by controlling operation of the steam supply unit, i.e., by repeating turn on/off of the operation of the heat generating unit.

It is preferable that the preset temperature range is 60° C.~100° C. The temperature range is a range in which dirt can be separated the most smoothly from the inside wall of the tub 120 or the inside/outside walls of the drum 130.

Moreover, it is preferable that the steam supply step is performed for a predetermined time period The predetermined time period is a range of time period in which the dirt can be separated from the inside wall of the tub 120 or from the inside/outside walls of the drum 130.

That is, different from the foregoing embodiment, the steam supply step is a series of steps for performing an actual soaking and an actual washing cycle.

Particularly, it is preferable that the drum 130 is kept rotating during the washing cycle with steam supplied is performed, for uniform washing.

If the steam supply is performed for a predetermined time period, the controller performs the rinsing.

That is, the drum 130 is kept rotating for a predetermined time period in a state a predetermined amount of the washing water is supplied to the tub 120 for rinsing under the control of the controller (S220), for performing the rinsing (S230).

In this instance, the water level of the washing water supplied for performing the rinsing cycle is a range of water level which can submerge a portion of the drum 130 substantially at least ⅕ to ⅓ (preferably in a range of ¼) of a total height of the drum 130 from the lowest surface of the drum 130 is submerged.

It is preferable that, during supply of the washing water for performing the rinsing cycle, the drum 130 is kept rotating in one direction at a speed lower than a speed at the time of general washing cycle.

Of course, the drum 130 is rotated in opposite directions, alternately.

Once the rinsing cycle is finished by the foregoing series of steps, a final draining is performed (S240), and a final spinning is performed (S260) to finish operation of the tub washing mode.

In the foregoing series of steps, it is preferable that the operation of the steam supply unit is stopped before starting the draining cycle after finish of the washing cycle. Of course, the operation of the steam supply unit may be stopped after the drain cycle, or before washing water supply for the rinsing cycle.

Another preferred embodiment of the present invention suggests a series of steps for performing a tub washing mode with detergent, or a tub washing mode without detergent selectively depending on user s requirement, i.e., use of the detergent, which will be described with reference to FIG. 14 in more detail.

At first, if the user selects the tub washing mode, the controller determines whether the tub washing mode uses special detergent only for the tub washing (S310).

If it is determined that the special detergent is used as a result of determination of the use of the special detergent, the steam is supplied to the tub 120 or the drum 130 (S321), and the washing water containing the special detergent is supplied to the tub 120, to perform the tub washing cycle (S322).

If the tub washing cycle is finished, the rinsing cycle identical to the foregoing embodiment is performed, and a final draining and a final spinning cycle (S323) is performed, to finish the tub washing mode.

If it is determined that the special detergent is not used as a result of determination of the use of the special detergent, after a tub washing cycle (S332) is performed, in which steam is supplied to the tub 120 or the drum 130 (S331) while rotating the drum 130 continuously, so that the steam separates the dirt from the tub 120 or the drum 130, washing water containing no special detergent is supplied to the tub 120, to perform the rinsing cycle (S333).

If the tub washing and the rinsing cycle is finished, draining and spinning cycle (S334) is performed, to finish the tub washing mode.

In the meantime, FIG. 15 illustrates another preferred embodiment of the present invention.

As shown, in the embodiment, washing water is supplied to the tub (S610) and the washing water is drained from the tub (S620). In these steps, powder detergent liable to remain in the tub or the drum is swept and drained. The powder detergent produces foam during the washing tub washing process to put a load on the motor which drives the drum, to cause a power loss. During the washing water supply and draining, the drum may be rotated at a low speed.

After the draining, washing water is supplied to the tub again (S630), and existence of laundry in the drum is determined (S640). If it is determined that there is no laundry in the drum in the laundry amount sensing step (S640), the washing water is supplied continuously, or in a case if a required amount of washing water is supplied already, the method proceeds to the next step.

Preferably, if it is determined in the laundry amount sensing step (S640) that there is laundry in the drum, it is preferable that an alarm is sound to inform to the user.

For the laundry sensing in the laundry amount sensing step, a method used at the time of washing course in the related art washing machine may be used.

If it is determined that there is no laundry in the drum, detergent for washing washing tub for an example, bleaching agent is introduced (S650), and a main washing step is performed (S660) for washing the tub or the drum by using the washing water and the bleaching agent.

The supply of the bleaching agent may be made by re-supply of washing water through a bleaching agent box (S650). In this instance, the washing water may be supplied, additionally.

In the main washing step (S660), the drum may be rotated in one direction continuously, or in opposite directions, alternately.

If the main washing step is performed for a preset time period, the washing water is drained (S670).

Then, rinsing and draining step may be performed, in which the tub or the drum is rinsed with washing water re-supplied thereto after the draining, or a spinning step may be performed, in which the drum is rotated at a high speed for extracting water to dry the drum.

The present invention is not limited only to the foregoing embodiments.

The method for washing a washing tub in a washing machine and a washing machine of the present invention is applicable, not only to the drum type washing machine, but also to a general pulsator type washing machine, and a washing machine having only a drum in a body without a tub.

INDUSTRIAL APPLICABILITY

The present invention relates to a method for washing a washing tub in a washing machine, and a washing machine having a washing tub washing course provided thereto for enabling washing tub washing by the same, and more particularly, to a method for washing with a washing machine which makes effective washing tub washing, with a small amount of washing water consumption, a low power consumption, and a high washing effect; and a washing machine having the same applied thereto.

The present invention solves various problems in the related art described before, and, particularly, the tub washing can be made smoothly with small amount of washing water, and power consumption.

The use of steam enables many good effects, such as soaking is effective, other than the sterilizing effect.

The present invention provides a washing method and a washing machine which has a better washing effect than the related art, and effective in view of time and energy.

Besides, there can be a variety of effects of the present invention depending on embodiments.

The invention claimed is:

1. A method of controlling a washing machine, the method comprising:
   generating and supplying steam from a steam generator, which is positioned outside a tub, to the tub to perform a tub washing; course, the supplying of steam including supplying steam to the tub or a drum until a temperature of at least one place of the tub reaches a preset range;
   controlling a supply of steam to maintain the temperature within the preset range for a preset time period;
   washing the tub or the drum using steam while rotating the drum when the steam is supplied, no water being introduced to the tub until the steam has washed the tub or drum; and
   supplying water to the tub after stopping the steam supplying.

2. The method of claim 1, further includes:
   washing the tub or the drum using the supplied water; and
   draining the water.

3. The method of claim 2, wherein the washing using the supplied water further includes supplying bleaching agent to the tub.

4. The method of claim 3, wherein the supplying of bleaching agent is performed by performing the supplying of water through a bleaching agent box.

5. The method of claim 2, wherein the washing using the supplied water further includes rotating the drum when the water is supplied.

6. The method of claim 1, wherein the washing using the supplied water further includes circulating water of the tub using a circulation pump.

7. The method of claim 6, wherein the washing using the supplied water further includes rotating when the water is circulated.

8. The method of claim 6, wherein the circulating water includes drawing out water from the tub and discharging the water to the tub.

9. The method of claim 8, wherein the discharging of the water includes discharging the water to an outside wall or an inside wall of the drum.

10. The method of claim 2, wherein the washing using the supplied water further includes:
    re-supplying water to the tub; and
    rinsing the tub with the re-supplied water.

11. The method of claim 10, wherein the washing further includes spinning the drum after the rinsing has been completed.

12. The method of claim 1, further comprising sensing whether laundry is in the washing machine.

13. A method for washing a tub or a drum in a washing machine having the tub, the drum rotatably mounted in the tub, and a steam generator for supplying steam to the tub, comprising:
    supplying steam to the tub by using the steam generator and performing a tub washing cycle when a user selects a tub washing course, the steam generator being positioned outside the tub and no water being introduced to the tub until the steam has washed the tub or drum, and the supplying of steam including supplying steam to the tub or the drum until a temperature of at least one place of the tub reaches a preset range and sensing temperature;
    supplying washing water to the tub when the tub washing cycle is finished; and
    stopping the steam supply between the performing the tub washing cycle and the supplying washing water to the tub.

14. The method as claimed in claim 13, wherein the washing machine further includes a temperature sensor for sensing a temperature of at least one place of the tub, and the steam supply step includes the step of supplying the steam such that the temperature sensed at the temperature sensor is within a fixed range.

15. The method as claimed in claim 14, wherein the steam supply step includes the step of turning on/off supply of the steam so that the temperature is maintained within a fixed range for a preset time period.

16. The method of claim 13, further comprising controlling a supply of steam to the tub to maintain the temperature within the preset range for a preset time period.

17. The method of claim 16, wherein the preset range is in a range of 60° C.~100° C.

18. The method of claim 16, wherein the preset range is higher than 80° C.

* * * * *